Jan. 20, 1953 C. P. DAY 2,625,955
CLOSURE CAP FOR TUBE FITTINGS
Filed March 25, 1946 2 SHEETS—SHEET 1

Inventor
Clarence P. Day
By
Mason, Porter, Diller & Stewart
Attorneys

Jan. 20, 1953        C. P. DAY        2,625,955

CLOSURE CAP FOR TUBE FITTINGS

Filed March 25, 1946        2 SHEETS—SHEET 2

Inventor
Clarence P. Day
By Mason, Porter, Diller & Stewart
Attorneys

Patented Jan. 20, 1953

2,625,955

UNITED STATES PATENT OFFICE 2,625,955

CLOSURE CAP FOR TUBE FITTINGS

Clarence P. Day, Cleveland, Ohio, assignor to The Parker Appliance Company, Cleveland, Ohio, a corporation of Ohio Application March 25, 1946, Serial No. 656,860

7 Claims. (Cl. 138—89)

The invention has to do with a closure cap for tube fittings and the present application is a continuation in part of my prior application Serial No. 580,877, filed March 3, 1945, now abandoned.

In the patent granted Arthur L. Parker on August 20, 1940, No. 2,212,183, there is shown a fitting to which the flared end of a tube is clamped. The fitting includes a body member having a tapered seat which is adapted to receive the flared end of a tube which is clamped thereagainst by a sleeve and nut.

In the patent granted Arthur L. Parker August 5, 1941, No. 2,251,717, there is shown a fitting to which the flareless end of tube is clamped. The fitting includes a body member having a bore to receive the end of the tube and a camming surface. The tube is secured to the body member by a sleeve and nut, the sleeve being contracted by the camming surface into gripping engagement with the tube. There is also another type of fitting for tubes which includes a body member having a tapered seat, a sleeve and a nut. The sleeve is secured to the tube by soldering and is provided with an enlarged head which is clamped against the body member by the nut. It is sometimes desirable to disconnect the tube and to close the body member to which the tube has been attached. This has been accomplished by substituting for the sleeve of the coupling a closure cap which is secured to the body member by means of the nut of the fitting and thus the opening through the body member is closed.

An object of the present invention is to provide a cap for closing fittings of the above types wherein the cap is housed within the nut and may be quickly attached thereto as a unit by the aid of a deformable retaining ring.

Figure 1:
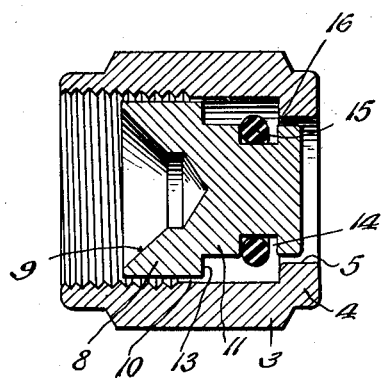
Figure 1 is a view in longitudinal section showing a closure cap and nut in partially assembled relation.

The improvement has to do with a closure cap for tube fittings of the above type. The type of fitting wherein the tube is provided with a flared end which is secured against a seat on the body member by means of a clamping sleeve and nut will first be described in detail.

The fitting includes a body portion 1 which is rigidly attached to the part to which a tube is to be connected. This body member is provided with a threaded portion 2 adapted to receive a nut 3. The nut 3 at its outer end has an inwardly extending flange 4 provided with an opening 5 through which the tube attached to the fitting extends. The body member is provided with a tapered portion 6 which provides a seat for the flared end of the tube. The body portion 1 of the fitting has a bore 7 therethrough.

The closure cap for closing the bore in the fitting when the tube is detached therefrom is indicated at 8. Said cap is provided with an annular tapered sealing surface 9 which is shaped to conform to the seat 6 on the body member. The cap extends all the way across the bore 7 in the body member and when forced into contact with the seat thereon, will close and seal the opening through the body member. The portion of the cap carrying the tapered sealing surface is cylindrical and is dimensioned so as to fit loosely within the nut, leaving a clearance space 10 between the cap and the nut. The cylindrical portion 8 is provided with a cylindrical extension 11 which is dimensioned so that it may pass through the opening 5 in the flange of the nut.

Between the cylindrical portion of the cap carrying the clearance surface and the extension 11 thereof is an annular shoulder 13 which is adapted to be contacted with by the flange of the nut. The cylindrical portion 11 is provided with an annular groove 14 in which is located a ring gasket 15 of deformable material, preferably rubber. While this ring gasket may be of any suitable cross sectional shaping, it is, as shown in the drawings, circular in cross section. The annular groove 14 is preferably dimensioned so that it may be forced over the end of the extension 11 into the groove and when in place, it will remain attached to the extension as a unit and will be substantially without any distortion from its original shape. The flange of the nut at the inner side of the opening 5 is provided with a rounded corner 16.

When it is desired to provide a closure for the fitting 1, the closure cap is inserted in the nut as shown in Figure 1. As it is forced to the left, the gasket will contact with the rounded corner 16. The gasket and the opening are so dimensioned that the initial contact of the edge of the nut flange with the ring gasket is fairly close to the maximum diameter of the ring gasket and therefore the relatively flat angle at such point readily induces radial inward squeeze or deformation of the ring gasket in preference to a radial outward expansion which would result in the pinching of the ring gasket.

Figure 2:
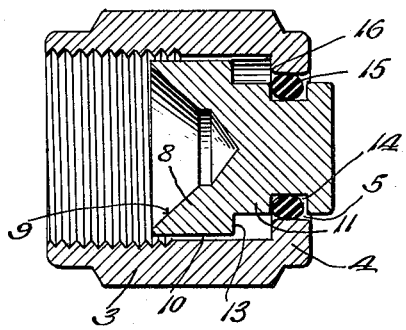
Figure 2 is a similar view but showing the retaining ring as it passes through the opening in the flange of the nut.

As shown in Figure 2, the ring gasket is deformed sufficiently so as to pass through the opening 5 in the flange of the nut. The groove is of sufficient width so as not to in any way interfere with this distortion of the ring gasket.

Figure 3:
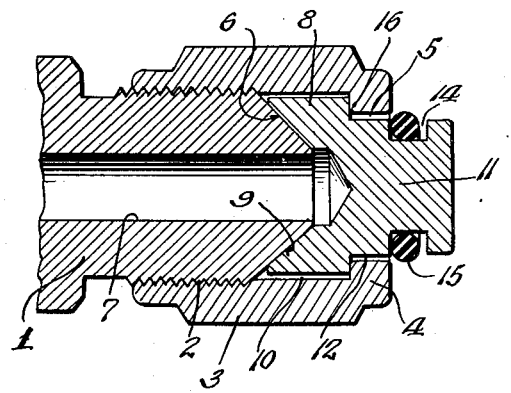
Figure 3 is a view showing the complete assembly with the cap secured to the fitting by the threading of the nut thereon.
Figure 4:
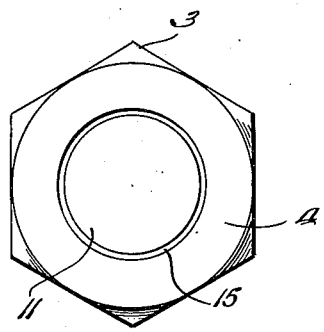
Figure 4 is an end view of the part shown in Figure 3.

In Figure 3 the cap and nut have been completely assembled and the gasket is entirely free from contact with the flange of the nut so that it expands to its normal shape. The inner wall of the recess is substantially in alignment with the outer end of the flange. This ring gasket functions as a retaining means for holding the closure cap in the nut. After they have been assembled, if the nut is placed on a support with the opening end down, the weight of the closure cap will bring the gasket into contact with the end of the nut, but unless considerable pressure is brought to bear for the purpose of separating the closure cap from the nut, said closure cap will remain supported by the nut. The clearance space between the nut and the cap under such conditions will be sealed by the gasket so that dust and dirt cannot work through to the inner face of the closure cap.

While the closure cap may be readily inserted in the nut by hand pressure applied thereto at its inner face, it can be equally easily disconnected from the nut by pressure applied to the outer end of the closure cap so that when it is desired to again connect a tube to the fitting, the cap can be removed, detached from the nut and the nut used in connection with a clamping sleeve for the securing of the tube to the seat on the fitting. This deformable gasket makes a very simply and easily operated retaining connection between the closure cap and the nut and when the closure cap is detached from the fitting, said gasket and closure cap will still be connected as a unit. Furthermore, the nut and cap may be stored separately and assembled as a unit if desired.

While the ring gasket serves to retain the closure cap and nut together as a unit, the gasket does not in any way interfere with the sealing gasket shifting in the nut to make proper sealing engagement between the tapered sealing surface on the closure cap and the seat 6 on the body member. Furthermore, during assembling of the closure cap and the nut the ring gasket keeps the closure cap centered and therefore there is no danger of the cap scratching or marring the bore. Furthermore, the sealing gasket as it passes through the opening in the flange of the nut will not scratch or mar the same.

Figure 5:
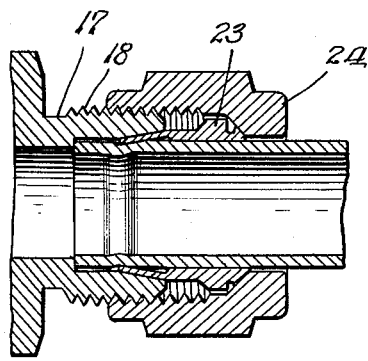
Figure 5 is a view in longitudinal section showing a flareless type of coupling wherein the tube is gripped by a sleeve forced by the nut against the camming surface on the body member.
Figure 6:
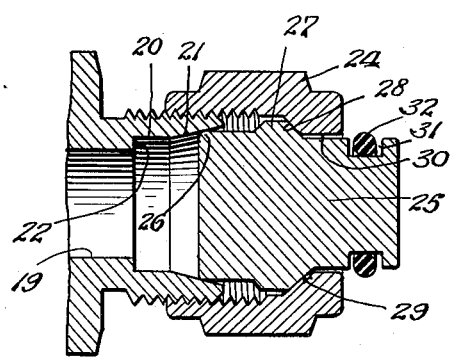
Figure 6 is a view in longitudinal section showing the improved closure cap applied to the body member in a fitting shown in Figure 5 for closing the same.

The application of the improved closure cap to a fitting for a flareless tube such as shown in Figure 5 will now be described. Briefly, the fitting includes a body member 17 having an external thread 18, a bore 19 and a counterbore 20 terminating in a camming surface 21. At the inner end of the counterbore is a seat 22. A clamping sleeve 23 is placed on the tube with the clamping nut 24. The inner edge of this sleeve is adapted to engage the tube and clamp the end thereof against the seat 22. This sleeve, when forced along the tube by the turning of the nut onto the body member, will contact with the camming surface 21 and will be contracted so as to bite into the tube. This form of fitting is merely illustrative of a type of fitting which is adapted to clamp the end of a flareless tube. The improved cap is adapted to close the bore through the body member when the tube is detached therefrom. The nut of the fitting is utilized for securing the closure cap to the body member. The closure cap is indicated at 25 in Figure 6 of the drawings. Said cap is provided with a sealing shoulder 26 which is shaped so as to engage the camming surface 21 and make sealing contact therewith. The cap 25 is provided with an enlarged annular portion 27 which forms a shoulder 28. The cap is dimensioned so as to fit loosely within the nut so that the shoulder 28 thereon will engage a tapered shoulder 29 on the nut. The outer portion 30 of the cap is dimensioned so as to extend freely through the opening through the flanged end of the nut. The outer end of the cap is provided with an annular channel 31 in which is disposed a gasket 32. This gasket is similar to that disclosed in Figures 1–3 of the drawings and functions precisely in the same manner as described above in connection with the ring gasket 15. After the tube has been disconnected, the sealing cap is placed in the nut of the fitting and the outer end portion carrying the gasket is forced through the opening in the flange of the nut and thus the cap is secured to the nut as a unit by the gasket 32. This is accomplished in the manner described in connection with the closure cap shown in Figures 1–3 and further description thereof is not thought necessary.

After the closure cap has been attached to the nut as a unit, then the nut is threaded onto the body of the fitting and the sealing shoulder 26 of the cap will engage the tapered camming surface 21 and make a very firm tight seal for the body member.

Figure 7:
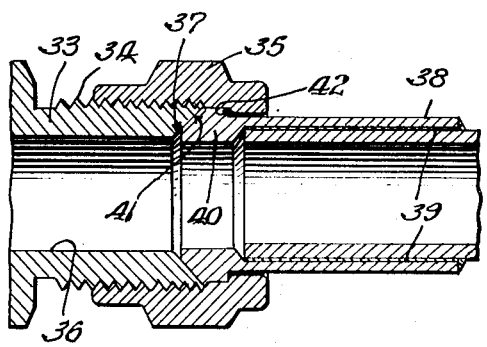
Figure 7 is a view in longitudinal section showing a tube secured to a body member by a sleeve and nut wherein the sleeve is soldered to the end of the tube and is provided with a head which is clamped against the body member.

The improved closure cap is equally adapted for the closing of the body member in the type of coupling shown in Figure 7. In this figure, the body member is indicated at 33. Said body member is provided with a thread 34 adapted to be engaged by a nut 35. The body member has a bore 36 therethrough and the outer end of the body member is tapered, as indicated at 37. The tube which is to be attached to this body member has its end portion inserted in a sleeve 38 to which sleeve the tube is secured by a solder bond 39. The tube is provided with an enlarged head 40. The inner end of this sleeve is flared as at 41 to fit the flared portion 37 on the body member. The nut is provided with a flange having an opening therethrough for the sleeve and a shoulder 42 which engages a shoulder on the head 40 of the sleeve 38.

Figure 8:
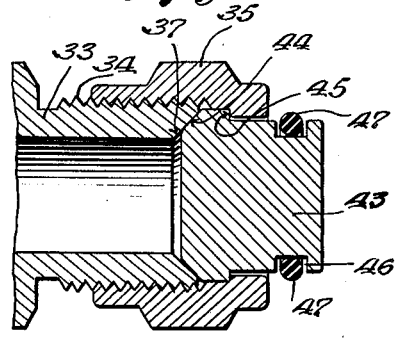
Figure 8 is a longitudinal section showing the improved closure cap attached to the body member of the fitting shown in Figure 7 by the nut of the fitting.

The improved closure cap, as applied to this type of coupling, is shown in Figure 8. The cap is indicated at 43. Said cap includes a head having a tapered face 44 adapted to seat against the tapered surface 37 on the body member. This closure cap fits loosely within the nut and is provided with a shoulder 45 which is engaged by the shoulder 42 on the nut 35. At the outer end, the closure cap is provided with a recess 46 in which is placed a ring gasket 47 similar to that described in connection with Figures 1-3. The closure cap is assembled in the nut as a unit in the manner described above, after which the nut is threaded onto the body member and the closure cap tightly sealed against the tapered surface 37.

It is noted that in all three types of fittings described, the nut of the fitting is employed for securing the closure cap to the body member for closing the same. It will also be noted that the closure cap is secured to the nut so as to be retained therein as a unit in the same manner in all types of fittings. The shaping of the end of the closure cap for each type of fitting is such as to make a sealed connection with the body member when attached thereto by the nut.

It is obvious that minor changes in the details of construction and shaping of the parts may be made without departing from the spirit of the invention as set forth in the appended claims.

I claim:

1. A closure assembly for a tube fitting having a tapered seat adapted to receive the flared end of a tube comprising a nut having a threaded connection with the fitting, a closure cap disposed within said nut and having a sealing surface shaped to conform to the seat on the fitting for the closing of the fitting when the nut is threaded onto the same, said nut having an opening surrounded by a flange adapted to engage the closure cap, said closure cap having an extension projecting through the nut opening and a deformable ring gasket carried by said extension and serving as a retaining ring for detachably securing the cap and nut together as a unit when detached from the fitting.

2. A closure assembly for a tube fitting having a tapered seat adapted to receive the flared end of a tube comprising a nut having a threaded connection with the fitting and an inwardly projecting flange, a closure cap disposed within said nut and having a sealing surface shaped to conform to the seat on the fitting for the closing of the fitting when the nut is threaded onto the same, said cap having an extension providing at its inner end a shoulder adapted to be engaged by the flange of the nut, said extension having an annular recess therein, the inner wall of which is in substantial alignment with the outer wall of the flange of the nut when the parts are assembled, a ring gasket disposed in said recess, said gasket being of slightly larger outer diameter than the opening through the flange of the nut whereby said gasket after passing through the opening will expand so as to retain the closure cap in the nut as a unit.

3. A closure assembly for the body member of a tube fitting comprising a cap having a sealing surface adapted to engage the body member of the fitting for closing the same, a nut for attaching said cap to said body member, said cap being dimensioned so as to be inserted within the nut, said nut having an opening surrounded by a flange adapted to engage the closure cap, said closure cap having an extension projecting through the nut opening and a deformable ring gasket carried by said extension and serving as a retaining ring for detachably securing the cap and nut together as a unit when detached from the fitting.

4. A closure assembly for the body member of a tube fitting comprising a cap having a sealing surface adapted to engage the body member of the fitting for closing the same, a nut for attaching said cap to said body member, said cap being dimensioned so as to be inserted within the nut and having an extension adapted to extend through the flange of the nut and a shoulder adapted to engage said flange, said extension having an annular recess therein, the inner wall of which is substantially in alignment with the outer wall of the flange of the nut when the parts are assembled, a ring gasket disposed in the recess, said gasket being initially of slightly larger outer diameter than the opening through the flange of the nut, whereby the gasket after passing through the opening will expand so as to retain the cap in the nut as a unit.

5. A closure assembly for the body member of a tube fitting in which the body member is provided with a camming surface adapted to contract a clamping sleeve into gripping engagement with the tube comprising a cap having a sealing surface adapted to engage the camming surface on the body member for closing the same, a nut for attaching said cap to said body member, said cap being dimensioned so as to be inserted within the nut whereby the nut may be used for attaching the cap to the body member, said closure cap having an extension projecting from said nut and a deformable ring gasket carried by said extension and serving as a retaining means for securing the cap and nut together as a unit prior to the attachment of the nut to the body member.

6. A closure assembly for a tube fitting comprising a nut having a transverse shoulder with a bore therethrough and adapted to be threadably connected with said fitting, a cap having a sealing surface and a shoulder engageable by said nut shoulder whereby said sealing surface may be pressed into engagement with said fitting, said cap having an extension projecting into said bore and beyond the nut, said extension having a recess therein, a yieldable rubber-like retaining member in said recess and located beyond said nut, a portion of said member projecting slightly beyond the diameter of said bore, said member when in said recess being sufficiently rigid to normally retain said cap within said nut but yieldable under pressure to allow said cap to pass into or out of said nut.

7. A cap adapted to be detachably connected to a nut having a transverse shoulder and a bore therethrough and further adapted to cooperate with said nut for closing a tube fitting, said cap having an enlarged head engageable by said nut shoulder for pressing said cap into closing engagement with said fitting, said cap also having a projection extending outward of said head and provided with an annular recess, a yieldable continuous ring within said recess and normally having a diameter slightly greater than the diameter of said bore, said gasket when in said recess being sufficiently rigid to normally retain said cap within said nut but yieldable under pressure to allow said cap to pass into or out of said nut.

CLARENCE P. DAY.

(References on following page)

REFERENCES CITED

The following references are of record in the file of this patent:

UNITED STATES PATENTS

| Number | Name | Date |
|---|---|---|
| 738,503 | Waters | Sept. 8, 1903 |
| 1,127,022 | Knight | Feb. 2, 1915 |
| 2,416,829 | Hartley | Mar. 4, 1947 |
| 2,451,441 | Main | Oct. 12, 1948 |

FOREIGN PATENTS

| Number | Country | Date |
|---|---|---|
| 844,623 | France | July 28, 1939 |